Patented Aug. 25, 1942

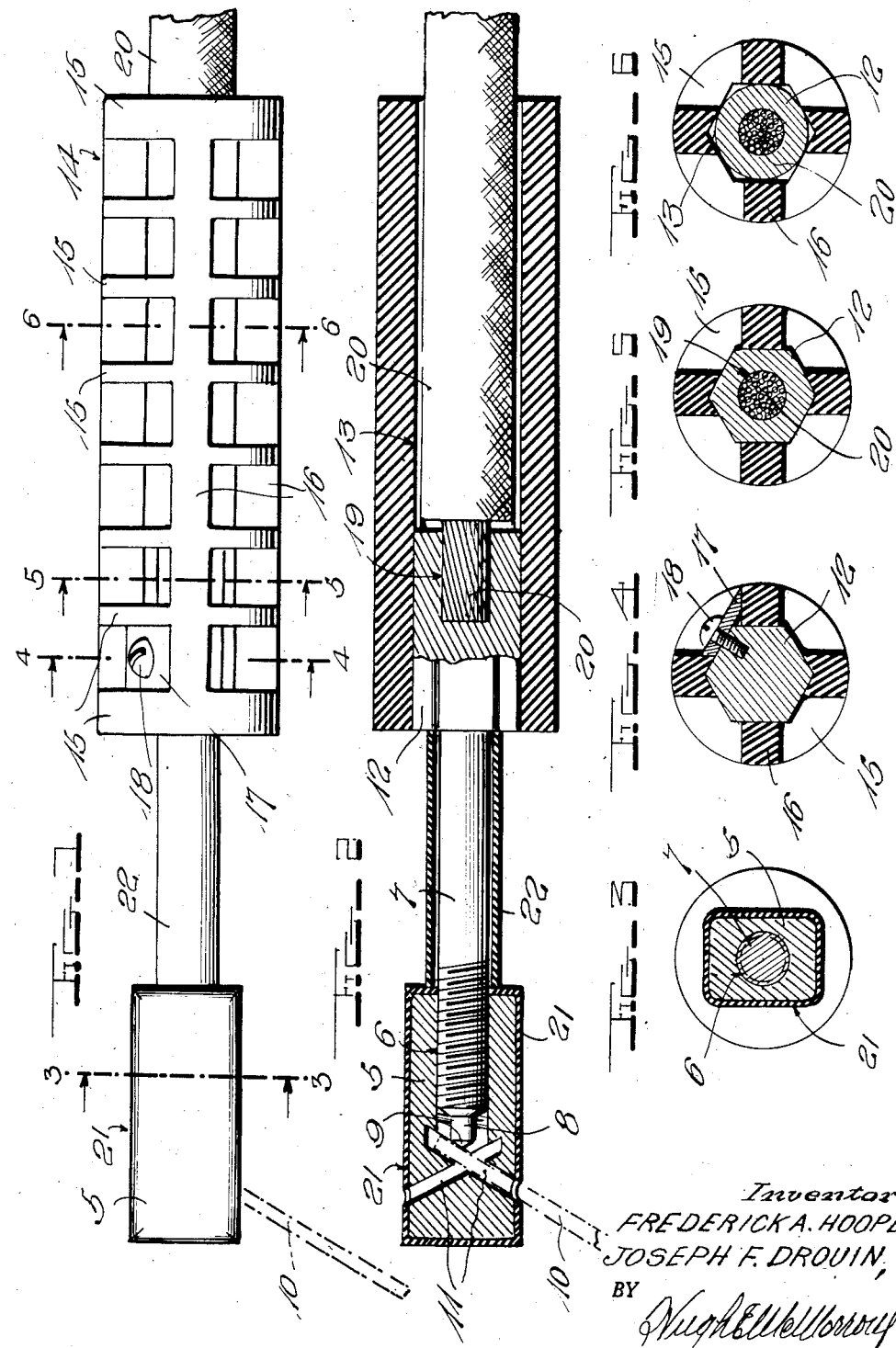

2,294,033

UNITED STATES PATENT OFFICE 2,294,033

ELECTRIC WELDING ROD HOLDER

Frederick A. Hooper and Joseph F. Drouin, Daly City, Calif.

Application August 21, 1940, Serial No. 353,576

1 Claim. (Cl. 219—8)

Our invention relates to electric welding rod holders and has as one of the principal objects thereof the provision of a welding rod holder so constructed and arranged that welding rods of various sizes may be securely held therein and at the same time establish positive electrical contact between the holder and rod.

Another object of our invention is to provide a welding holder of the above described character which is simple in construction, durable in use, efficient in operation and economical in manufacture.

Other objects and advantages will be apparent from the following description, appended claim and annexed drawing.

Referring to the drawing wherein like reference characters designate like parts throughout the several views:

Figure 1 is a side elevation of our invention.

Figure 2 is a longitudinal sectional view thereof.

Figure 3 is a sectional view taken on the line 3—3 of Figure 1.

Figure 4 is a sectional view taken on the line 4—4 of Figure 1.

Figure 5 is a sectional view taken on the line 5—5 of Figure 1.

Figure 6 is a sectional view taken on the line 6—6 of Figure 1.

As illustrated in the drawing, my novel form of welding rod holder comprises an elongated head 5 having its rear end section fashioned with a threaded bore 6 in which is adjustably received the threaded front end section of a shaft bar 7. The front end of the shaft 7 is formed with a reduced portion 8 terminating in a conical end 9 for clamping engagement with a welding rod 10.

The front end section of the head 5 is fashioned with a pair of diagonally crossed slots 11 having their open ends oppositely opposed and with one arranged on each side of the head. The diameter of one slot is greater than that of the other whereby the ends of welding rods of various sizes may be inserted therein and clamped against the side walls of the slots 11 by the end 9 of the shaft 7 when the latter is adjusted within the bore 6. The rear end of the shaft 7 is formed with a hexagon-shaped section 12 disposed within a similar shaped opening 13 formed in the handle 14.

The handle comprises a plurality of spaced transversely extending and cylindrical shaped portions 15 connected together by ribs 16. The handle 14 is constructed of insulating material and is provided at its front end with a plate 17 disposed between a pair of the portions 15 and a pair of the ribs 16 as clearly illustrated in Figures 1 and 2 of the drawing. The plate 17 has extending thereto a screw 18 threaded into the section 12 whereby said section is maintained fixed within the handle 14 for rotation therewith. The rear end of the section 12 is provided with a socket 19 in which is fixed the end of an electric cable 20, the latter extending outwardly through the rear end of the handle for connection with a source of electric energy.

The head 5 is covered with insulating material 21 having openings registering with the bore 6 and slots 11. Loosely mounted on the shaft 7 is a sleeve 22 interposed between the head 5 and section 12, said sleeve being constructed of insulating material.

From the foregoing it will be noted that the head, shaft and handle are provided with insulating means whereby the hand of the operator is precluded from electrical contact therewith. Obviously, by loosening the front end of the shaft 7 in the head 5 a welding rod may be detached therefrom and replaced therein according to the desires of the operator and when the rod is thus replaced the shaft is adjusted within the head to effect clamping of the rod therein.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claim.

What we claim is:

In an electric welding rod holder, a substantially rectangular shaped rigid head provided with diagonally extending connecting sockets of different sizes opening outwardly through opposite sides of the head to receive welding rods of different sizes, a bar threaded in the head from one end thereof and entering said sockets for securing a welding rod in either of said sockets, an insulated handle adjustably mounted on the bar and confining a connection of the bar with an electric conductor, and insulating coverings for the head and the bar.

FREDERICK A. HOOPER.
JOSEPH F. DROUIN.